Patented Dec. 17, 1946

2,412,688

UNITED STATES PATENT OFFICE 2,412,688

LUBRICANT

Charles B. Large, Pasadena, Maurice J. Zucrow, Altadena, and Robert L. Hirsch, Glendale, Calif., assignors to Aerojet Engineering Corporation, Azusa, Calif., a corporation of Delaware No Drawing. Application September 18, 1944, Serial No. 554,720

6 Claims. (Cl. 252—43)

This invention relates to lubricants and more particularly to lubricants adapted to withstand corrosive fluids and strong oxidizing inorganic acids.

An object of our invention is to provide a lubricant capable of effectively lubricating and protecting moving metal parts such as bearings, and bearing surfaces, rotating seals, stuffing boxes, packing glands and other metal surfaces where these parts or surfaces are in contact with strong oxidizing inorganic acids such as nitric acid in any or all concentrations.

A related object is to provide an effective chemically inert liquid sealing medium, which may be used in direct contact with strong oxidizing inorganic acids, such as nitric acid, or other corrosive fluids, when these substances are present in any concentration.

Another object is to provide a lubricant suitable for use in heavy-duty types of operations which subject the lubricant to extreme pressures.

According to our invention the lubricant comprises a mixture of highly halogenated solvents with other halogenated compounds compatible with the solvent and individually resistant to the reaction of strong inorganic oxidizing acids such as nitric acid in all strengths. The term compatible signifies that the solute and solvent may be mixed together forming a clear solution and that the compounds are non-reactive with each other.

Such a lubricant has the meritorious advantage of being efficient at extremely low temperatures as well as at high temperatures.

In the chlorinated field of halogenated compounds, the preferred chlorinated compound is 1000 centipoise (cps.) grade chlorinated natural rubber, and the preferred chlorinated solvent is a polychloropropane having six or seven of the hydrogens replaced by chlorine. When these two substances are mixed in varying proportions it is possible to produce a series of lubricants having viscosity characteristics which conform approximately to S. A. E. specifications for petroleum lubricating oils. For example, 2% of 1000 cps. chlorinated rubber dissolved in polychloropropane comprising a commercial mixture of hexachloropropane and heptachloropropane produces an oil having viscosity characteristics similar to those of an S. A. E. 10 oil. A solution of 4% of 1000 cps. chlorinated rubber in polychloropropane comprising a commercial mixture of hexachloropropane and heptachloropropane produces an oil having viscosity characteristics similar to those of an S. A. E. 60 lubricating oil. These mixtures have been found to possess highly effective corrosion resisting properties combined with good viscosity and lubricating properties.

When the viscosity of our lubricant is tested at various temperatures it behaves similarly to the corresponding grades of refined Pennsylvania lubricating oils. An advantage of this particular type of lubricant is that the lubricant is relatively inert to all concentrations of nitric acid and fails to show any appreciable decomposition even when coming in contact with nitric acid heated as high as 250° F. Another advantage is that the lubricant possesses excellent lubricating properties and compares favorably with an ordinary high-grade of Pennsylvania lubricating oil. A further advantage is that it is possible to produce a wide range of viscosity characteristics by varying the mixture ratio or composition of the lubricant. Furthermore, the lubricant can be blended and the lower blends have very low pour points. For example, from 1% to 4% of 1000 cps. chlorinated rubber in polychloropropane comprising a commercial mixture of hexachloropropane and heptachloropropane remains fluid and clear at −38° C. A mixture containing 5.6% of 1000 cps. chlorinated rubber was slightly viscous at −38°. A mixture containing 9% of 1000 cps. chlorinated rubber was solid at −38°. An additional advantage is that the lubricant exhibits excellent adhesive properties between the liquid phase and the solid metal. The lubricant serves as a protective coating to all the metal surfaces which it contacts insulating them from the corrosive action of the nitric acid.

It will be recognized that many variations particularly of fluorinated or chlorinated mixtures are possible, within the scope of this invention, and mixtures may be especially compounded to meet particular specifications. The above examples are accordingly intended only to be illustrative and not as limitations of the invention, which is set forth in the appended claims.

We claim:

1. In the lubrication of bearings the improvement which comprises disposing on the bearing surfaces a solution in a polychloropropane liquid of, about 1% to 9% chlorinated natural rubber, and exposing the bearings thus treated to extreme oxidizing conditions such as those developed by the presence of strong mineral acids.

2. In the lubrication of bearings the improvement which comprises disposing on the bearing surfaces a solution of, about 1% to 9% chlorinated natural rubber in a polychloropropane in which six to seven hydrogen atoms have been replaced by chlorine, and exposing the bearings thus treated to a strong mineral acid.

3. A lubricant which retains its lubricating qualities in the presence of strong mineral acids and which comprises a solution of, about 1% to 9% chlorinated natural rubber in a polychloropropane liquid.

4. A lubricant which retains its lubricating qualities in the presence of strong mineral acids and which comprises a solution of, about 1% to 9% chlorinated natural rubber in a polychloropropane in which six to seven hydrogen atoms have been replaced by chlorine.

5. A lubricant which retains its lubricating qualities in the presence of strong mineral acids and which comprises a solution of, about 1% to 9% chlorinated natural rubber between 100 and 1000 cps. grade in a polychloropropane liquid.

6. A lubricant which retains its lubricating qualities in the presence of strong mineral acids and which comprises a solution of, about 1% to 9% total of several cps. grades of chlorinated natural rubber dissolved in a polychloropropane in which six to seven hydrogen atoms have been replaced by chlorine.

CHARLES B. LARGE.
MAURICE J. ZUCROW.
ROBERT L. HIRSCH.